US012225095B2

(12) United States Patent
Samaranayake et al.

(10) Patent No.: US 12,225,095 B2
(45) Date of Patent: *Feb. 11, 2025

(54) MESSAGING ACHIEVEMENT PICTOGRAPH DISPLAY SYSTEM

(71) Applicant: Snap Inc., Santa Monica, CA (US)

(72) Inventors: Chamal Samaranayake, Venice, CA (US); Nathan Boyd, Los Angeles, CA (US); Jonathan Brody, Marina del Rey, CA (US); Nicholas Richard Allen, Venice, CA (US); Evan Spiegel, Los Angeles, CA (US)

(73) Assignee: Snap Inc., Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/126,919

(22) Filed: Mar. 27, 2023

(65) Prior Publication Data
US 2023/0234521 A1 Jul. 27, 2023

Related U.S. Application Data

(63) Continuation of application No. 15/929,511, filed on May 6, 2020, now Pat. No. 11,627,194, which is a
(Continued)

(51) Int. Cl.
H04L 67/50 (2022.01)
H04L 51/043 (2022.01)
(Continued)

(52) U.S. Cl.
CPC .......... *H04L 67/535* (2022.05); *H04L 51/043* (2013.01); *H04L 51/224* (2022.05); *H04L 51/52* (2022.05); *H04L 67/01* (2022.05)

(58) Field of Classification Search
CPC . H04L 67/1097; H04L 67/02; H04L 67/1091; H04L 67/26; H04L 67/22;
(Continued)

(56) References Cited

U.S. PATENT DOCUMENTS 5,754,939 A 5/1998 Herz et al.
6,038,295 A 3/2000 Mattes
(Continued)

FOREIGN PATENT DOCUMENTS

CA 2887596 A1 7/2015
CN 102006365 A 4/2011
(Continued)

OTHER PUBLICATIONS

"U.S. Appl. No. 15/098,630, Final Office Action mailed Aug. 7, 2019", 7 pgs.
(Continued)

Primary Examiner — Dhairya A Patel
(74) Attorney, Agent, or Firm — Schwegman Lundberg & Woessner, P.A.

(57) ABSTRACT

Systems and methods for causing display of a messaging achievement pictograph based on messaging activity are provided. In some example embodiments, a message activity communication is received by a messaging activity service from a client device, the messaging active communication causing and adjustment to a message activity score and the message activity score transgressing a first threshold activity score. Responsive to the message activity transgressing the first threshold activity score, an achievement pictograph is displayed on the client device. In some example embodiments, the pictograph may be ephemeral and removal of the pictograph may be triggered by a designated time or by the message activity score transgressing a second threshold activity score. In some example embodiments, a notification is generated that notifies a user of the display or removal from display of the achievement pictograph.

20 Claims, 11 Drawing Sheets

Related U.S. Application Data continuation of application No. 15/098,630, filed on Apr. 14, 2016, now Pat. No. 10,686,899.

(60) Provisional application No. 62/318,950, filed on Apr. 6, 2016.

(51) Int. Cl.
*H04L 51/224* (2022.01)
*H04L 51/52* (2022.01)
*H04L 67/01* (2022.01)

(58) Field of Classification Search
CPC ......... H04L 67/42; H04L 51/00; H04L 51/02; H04L 51/10; H04L 51/32; H04L 51/24; H04L 51/043
See application file for complete search history.

(56) References Cited

U.S. PATENT DOCUMENTS

| | | | |
|---|---|---|---|
| 6,158,044 A | 12/2000 | Tibbetts | |
| 6,167,435 A | 12/2000 | Druckenmiller et al. | |
| 6,205,432 B1 | 3/2001 | Gabbard et al. | |
| 6,310,694 B1 | 10/2001 | Okimoto et al. | |
| 6,484,196 B1 | 11/2002 | Maurille | |
| 6,487,586 B2 | 11/2002 | Ogilvie et al. | |
| 6,665,531 B1 | 12/2003 | Soderbacka et al. | |
| 6,701,347 B1 | 3/2004 | Ogilvie | |
| 6,711,608 B1 | 3/2004 | Ogilvie | |
| 6,757,713 B1 | 6/2004 | Ogilvie et al. | |
| 6,980,909 B2 | 12/2005 | Root et al. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,243,163 B1 | 7/2007 | Friend et al. | |
| 7,278,168 B1 | 10/2007 | Chaudhury et al. | |
| 7,356,564 B2 | 4/2008 | Hartselle et al. | |
| 7,376,715 B2 | 5/2008 | Cunningham et al. | |
| 7,411,493 B2 | 8/2008 | Smith | |
| 7,478,402 B2 | 1/2009 | Christensen et al. | |
| 7,496,347 B2 | 2/2009 | Puranik | |
| 7,519,670 B2 | 4/2009 | Hagale et al. | |
| 7,535,890 B2 | 5/2009 | Rojas | |
| 7,607,096 B2 | 10/2009 | Oreizy et al. | |
| 7,703,140 B2 | 4/2010 | Nath et al. | |
| 7,912,896 B2 | 3/2011 | Wolovitz et al. | |
| 8,131,597 B2 | 3/2012 | Hudetz | |
| 8,170,957 B2 | 5/2012 | Richard | |
| 8,199,747 B2 | 6/2012 | Rojas et al. | |
| 8,214,443 B2 | 7/2012 | Hamburg | |
| 8,238,947 B2 | 8/2012 | Lottin et al. | |
| 8,244,593 B2 | 8/2012 | Klinger et al. | |
| 8,312,097 B1 | 11/2012 | Siegel et al. | |
| 8,332,475 B2 | 12/2012 | Rosen et al. | |
| 8,570,907 B2 | 10/2013 | Garcia, Jr. et al. | |
| 8,718,333 B2 | 5/2014 | Wolf et al. | |
| 8,724,622 B2 | 5/2014 | Rojas | |
| 8,745,132 B2 | 6/2014 | Obradovich | |
| 8,751,582 B1* | 6/2014 | Behforooz | H04L 51/043 709/206 |
| 8,874,677 B2 | 10/2014 | Rosen et al. | |
| 8,909,679 B2 | 12/2014 | Root et al. | |
| 8,909,714 B2 | 12/2014 | Agarwal et al. | |
| 8,909,725 B1 | 12/2014 | Sehn | |
| 8,914,752 B1 | 12/2014 | Spiegel | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,083,770 B1 | 7/2015 | Drose et al. | |
| 9,094,137 B1 | 7/2015 | Sehn et al. | |
| 9,100,806 B2 | 8/2015 | Rosen et al. | |
| 9,100,807 B2 | 8/2015 | Rosen et al. | |
| 9,113,301 B1 | 8/2015 | Spiegel et al. | |
| 9,148,424 B1 | 9/2015 | Yang | |
| 9,191,776 B2 | 11/2015 | Root et al. | |
| 9,204,252 B2 | 12/2015 | Root | |
| 9,225,805 B2 | 12/2015 | Kujawa et al. | |
| 9,225,897 B1 | 12/2015 | Sehn et al. | |
| 9,237,202 B1 | 1/2016 | Sehn | |
| 9,264,463 B2 | 2/2016 | Rubinstein et al. | |
| 9,276,886 B1 | 3/2016 | Samaranayake | |
| 9,294,425 B1* | 3/2016 | Son | H04L 51/18 |
| 9,385,983 B1 | 7/2016 | Sehn | |
| 9,386,165 B2* | 7/2016 | Raleigh | H04L 12/1435 |
| 9,396,354 B1 | 7/2016 | Murphy et al. | |
| 9,407,712 B1 | 8/2016 | Sehn | |
| 9,407,816 B1 | 8/2016 | Sehn | |
| 9,430,783 B1 | 8/2016 | Sehn | |
| 9,443,227 B2 | 9/2016 | Evans et al. | |
| 9,482,882 B1 | 11/2016 | Hanover et al. | |
| 9,482,883 B1 | 11/2016 | Meisenholder | |
| 9,489,661 B2 | 11/2016 | Evans et al. | |
| 9,491,134 B2 | 11/2016 | Rosen et al. | |
| 9,532,171 B2 | 12/2016 | Allen et al. | |
| 9,537,811 B2 | 1/2017 | Allen et al. | |
| 9,560,006 B2 | 1/2017 | Prado et al. | |
| 9,628,950 B1 | 4/2017 | Noeth et al. | |
| 9,652,896 B1 | 5/2017 | Jurgenson et al. | |
| 9,659,244 B2 | 5/2017 | Anderton et al. | |
| 9,693,191 B2 | 6/2017 | Sehn | |
| 9,705,831 B2 | 7/2017 | Spiegel | |
| 9,742,713 B2 | 8/2017 | Spiegel et al. | |
| 9,785,796 B1 | 10/2017 | Murphy et al. | |
| 9,825,898 B2 | 11/2017 | Sehn | |
| 9,854,219 B2 | 12/2017 | Sehn | |
| 9,961,520 B2 | 5/2018 | Brooks et al. | |
| 10,097,497 B1* | 10/2018 | Son | H04L 51/42 |
| 10,686,899 B2* | 6/2020 | Samaranayake | H04L 51/224 |
| 11,240,052 B2* | 2/2022 | Silva | H04L 51/214 |
| 11,368,524 B1* | 6/2022 | Musumeci | H04L 41/16 |
| 11,500,525 B2* | 11/2022 | Barkman | H04N 21/23614 |
| 11,627,194 B2* | 4/2023 | Samaranayake | H04L 51/224 709/206 |
| 2002/0047868 A1 | 4/2002 | Miyazawa | |
| 2002/0144154 A1 | 10/2002 | Tomkow | |
| 2003/0052925 A1 | 3/2003 | Daimon et al. | |
| 2003/0126215 A1 | 7/2003 | Udell et al. | |
| 2003/0217106 A1 | 11/2003 | Adar et al. | |
| 2004/0203959 A1 | 10/2004 | Coombes | |
| 2005/0097176 A1 | 5/2005 | Schatz et al. | |
| 2005/0198128 A1 | 9/2005 | Anderson et al. | |
| 2005/0223066 A1 | 10/2005 | Buchheit et al. | |
| 2006/0242239 A1 | 10/2006 | Morishima et al. | |
| 2006/0270419 A1 | 11/2006 | Crowley et al. | |
| 2007/0038715 A1 | 2/2007 | Collins et al. | |
| 2007/0064899 A1 | 3/2007 | Boss et al. | |
| 2007/0073823 A1* | 3/2007 | Cohen | G06Q 10/107 709/207 |
| 2007/0214216 A1 | 9/2007 | Carrer et al. | |
| 2007/0233801 A1 | 10/2007 | Eren et al. | |
| 2008/0055269 A1 | 3/2008 | Lemay et al. | |
| 2008/0120409 A1 | 5/2008 | Sun et al. | |
| 2008/0207176 A1 | 8/2008 | Brackbill et al. | |
| 2008/0270938 A1 | 10/2008 | Carlson | |
| 2008/0306826 A1 | 12/2008 | Kramer et al. | |
| 2008/0313346 A1 | 12/2008 | Kujawa et al. | |
| 2009/0042588 A1 | 2/2009 | Lottin et al. | |
| 2009/0132453 A1 | 5/2009 | Hangartner et al. | |
| 2010/0082427 A1 | 4/2010 | Burgener et al. | |
| 2010/0131880 A1 | 5/2010 | Lee et al. | |
| 2010/0185665 A1 | 7/2010 | Horn et al. | |
| 2010/0306669 A1 | 12/2010 | Della Pasqua | |
| 2011/0099507 A1 | 4/2011 | Nesladek et al. | |
| 2011/0145564 A1 | 6/2011 | Moshir et al. | |
| 2011/0202598 A1 | 8/2011 | Evans et al. | |
| 2011/0213845 A1 | 9/2011 | Logan et al. | |
| 2011/0286586 A1 | 11/2011 | Saylor et al. | |
| 2011/0320373 A1 | 12/2011 | Lee et al. | |
| 2012/0028659 A1 | 2/2012 | Whitney et al. | |
| 2012/0066615 A1 | 3/2012 | Brugler et al. | |
| 2012/0131171 A1* | 5/2012 | Samuel | G06Q 10/107 709/224 |
| 2012/0184248 A1 | 7/2012 | Speede | |

(56) References Cited

U.S. PATENT DOCUMENTS

| | | | |
|---|---|---|---|
| 2012/0209921 A1 | 8/2012 | Adafin et al. | |
| 2012/0209924 A1 | 8/2012 | Evans et al. | |
| 2012/0254325 A1 | 10/2012 | Majeti et al. | |
| 2012/0278692 A1 | 11/2012 | Shi | |
| 2012/0295676 A1 | 11/2012 | Ackerson et al. | |
| 2012/0304080 A1 | 11/2012 | Wormald et al. | |
| 2013/0071093 A1 | 3/2013 | Hanks et al. | |
| 2013/0152000 A1 | 6/2013 | Liu et al. | |
| 2013/0194301 A1 | 8/2013 | Robbins et al. | |
| 2013/0290443 A1 | 10/2013 | Collins et al. | |
| 2014/0032682 A1 | 1/2014 | Prado et al. | |
| 2014/0092130 A1 | 4/2014 | Anderson et al. | |
| 2014/0106799 A1* | 4/2014 | Audenaert | H04L 51/216 |
| | | | 455/466 |
| 2014/0122787 A1 | 5/2014 | Shalvi et al. | |
| 2014/0201527 A1 | 7/2014 | Krivorot | |
| 2014/0282096 A1 | 9/2014 | Rubinstein et al. | |
| 2014/0287779 A1 | 9/2014 | O'keefe et al. | |
| 2014/0325383 A1 | 10/2014 | Brown et al. | |
| 2014/0359024 A1 | 12/2014 | Spiegel | |
| 2014/0359032 A1 | 12/2014 | Spiegel et al. | |
| 2014/0379812 A1 | 12/2014 | Bastide, II et al. | |
| 2015/0095020 A1 | 4/2015 | Leydon | |
| 2015/0195406 A1* | 7/2015 | Dwyer | G10L 15/02 |
| | | | 379/265.07 |
| 2015/0199082 A1 | 7/2015 | Scholler et al. | |
| 2015/0222586 A1* | 8/2015 | Ebersman | G06F 40/274 |
| | | | 715/752 |
| 2015/0227602 A1 | 8/2015 | Ramu et al. | |
| 2015/0310507 A1* | 10/2015 | Woodward | H04L 65/403 |
| | | | 705/329 |
| 2015/0317293 A1 | 11/2015 | Greisson et al. | |
| 2015/0356449 A1* | 12/2015 | Vainstein | G06Q 50/01 |
| | | | 706/48 |
| 2016/0085773 A1 | 3/2016 | Chang et al. | |
| 2016/0085863 A1 | 3/2016 | Allen et al. | |
| 2016/0086670 A1 | 3/2016 | Gross et al. | |
| 2016/0099901 A1 | 4/2016 | Allen et al. | |
| 2016/0180325 A1* | 6/2016 | Davis | G06Q 20/40 |
| | | | 705/44 |
| 2016/0180887 A1 | 6/2016 | Sehn | |
| 2016/0239165 A1* | 8/2016 | Chen | H04L 51/42 |
| 2016/0277419 A1 | 9/2016 | Allen et al. | |
| 2016/0292288 A1* | 10/2016 | Walton | G06F 16/335 |
| 2016/0294755 A1* | 10/2016 | Prabhu | H04L 51/046 |
| 2016/0321708 A1 | 11/2016 | Sehn | |
| 2016/0359957 A1 | 12/2016 | Laliberte | |
| 2016/0359987 A1 | 12/2016 | Laliberte | |
| 2016/0379511 A1 | 12/2016 | Dawson et al. | |
| 2017/0083174 A1 | 3/2017 | Tobens, III et al. | |
| 2017/0118189 A1* | 4/2017 | Venkatakrishnan | G06Q 20/10 |
| 2017/0147696 A1* | 5/2017 | Evnine | G06F 16/9535 |
| 2017/0161382 A1 | 6/2017 | Ouimet et al. | |
| 2017/0257338 A1* | 9/2017 | Zhang | H04L 51/234 |
| 2017/0263029 A1 | 9/2017 | Yan et al. | |
| 2017/0287006 A1 | 10/2017 | Azmoodeh et al. | |
| 2017/0289234 A1* | 10/2017 | Andreou | H04L 51/10 |
| 2017/0295250 A1 | 10/2017 | Samaranayake et al. | |
| 2017/0374003 A1 | 12/2017 | Allen et al. | |
| 2017/0374508 A1 | 12/2017 | Davis et al. | |
| 2019/0005419 A1* | 1/2019 | Howard | G06F 16/125 |
| 2020/0267227 A1 | 8/2020 | Samaranayake et al. | |

FOREIGN PATENT DOCUMENTS

| | | |
|---|---|---|
| CN | 102439955 A | 5/2012 |
| CN | 102510358 A | 6/2012 |
| CN | 102821060 A | 12/2012 |
| CN | 104541258 | 4/2015 |
| CN | 109314659 A | 2/2019 |
| CN | 109314659 B | 10/2022 |
| CN | 115550301 A | 12/2022 |
| KR | 102175016 B1 | 10/2020 |
| KR | 102297326 B1 | 9/2021 |
| KR | 102427317 B1 | 8/2022 |
| KR | 102472553 B1 | 12/2022 |
| WO | WO-2012000107 A1 | 1/2012 |
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |

OTHER PUBLICATIONS

"U.S. Appl. No. 15/098,630, Final Office Action mailed Sep. 7, 2018", 11 pgs.

"U.S. Appl. No. 15/098,630, Non Final Office Action mailed Jan. 25, 2019", 12 pgs.

"U.S. Appl. No. 15/098,630, Non Final Office Action mailed Feb. 7, 2018", 10 pgs.

"U.S. Appl. No. 15/098,630, Notice of Allowance mailed Feb. 6, 2020", 11 pgs.

"U.S. Appl. No. 15/098,630, Response filed Jan. 7, 2019 to Final Office Action mailed Sep. 7, 2018", 11 pgs.

"U.S. Appl. No. 15/098,630, Response filed Jan. 30, 2020 to Final Office Action mailed Aug. 7, 2019", 17 pgs.

"U.S. Appl. No. 15/098,630, Response filed Apr. 22, 2019 to Non Final Office Action mailed Jan. 25, 2019", 15 pgs.

"U.S. Appl. No. 15/098,630, Response filed May 7, 2018 to Non Final Office Action mailed Feb. 7, 2018", 13 pgs.

"U.S. Appl. No. 15/929,511, Final Office Action mailed Aug. 16, 2022", 18 pgs.

"U.S. Appl. No. 15/929,511, Final Office Action mailed Oct. 13, 2021", 18 pgs.

"U.S. Appl. No. 15/929,511, Non Final Office Action mailed Feb. 17, 2022", 21 pgs.

"U.S. Appl. No. 15/929,511, Non Final Office Action mailed Mar. 31, 2021", 24 pgs.

"U.S. Appl. No. 15/929,511, Notice of Allowance mailed Nov. 30, 2022", 10 pgs.

"U.S. Appl. No. 15/929,511, PTO Response to Rule 312 Communication mailed Feb. 17, 2023", 2 pgs.

"U.S. Appl. No. 15/929,511, Response filed Jan. 13, 2022 to Final Office Action mailed Oct. 13, 2021", 12 pgs.

"U.S. Appl. No. 15/929,511, Response filed May 17, 2022 to Non Final Office Action mailed Feb. 17, 2022", 11 pgs.

"U.S. Appl. No. 15/929,511, Response filed Jun. 30, 2021 to Non Final Office Action mailed Mar. 31, 2021", 10 pgs.

"U.S. Appl. No. 15/929,511, Response filed Nov. 16, 2022 to Final Office Action mailed Aug. 16, 2022", 10 pgs.

"Chinese Application Serial No. 201780034690.4, Decision of Rejection mailed Jun. 8, 2021", w/ English Translation, 15 pgs.

"Chinese Application Serial No. 201780034690.4, Office Action mailed Jan. 28, 2022", W/English Translation, 4 pgs.

"Chinese Application Serial No. 201780034690.4, Office Action mailed Mar. 16, 2021", w/ English Translation, 16 pgs.

"Chinese Application Serial No. 201780034690.4, Office Action mailed Aug. 19, 2020", w/ English translation, 16 pgs.

"Chinese Application Serial No. 201780034690.4, Response filed Dec. 31, 2020 to Office Action mailed Aug. 19, 2020", w/ English Claims, 22 pgs.

"Chinese Application Serial No. 201780034690.4, Response Filed Apr. 11, 2022 to Office Action mailed Jan. 28, 2022", W/ English Claims, 15 pgs.

"International Application Serial No. PCT/US2017/026345, International Preliminary Report on Patentability mailed Oct. 18, 2018", 8 pgs.

"International Application Serial No. PCT/US2017/026345, International Search Report mailed Jun. 16, 2017", 2 pgs.

(56) References Cited

OTHER PUBLICATIONS

"International Application Serial No. PCT/US2017/026345, Written Opinion mailed Jun. 16, 2017", 6 pgs.
"Korean Application Serial No. 10-2018-7032088, Notice of Preliminary Rejection mailed Jan. 20, 2020", w/ English Translation, 6 pgs.
"Korean Application Serial No. 10-2018-7032088, Response filed Mar. 20, 2020 to Notice of Preliminary Rejection mailed Jan. 20, 2020", w/ English Claims, 26 pgs.
"Korean Application Serial No. 10-2020-7031503, Notice of Preliminary Rejection mailed Nov. 26, 2020", w/ English Translation, 11 pgs.
"Korean Application Serial No. 10-2020-7031503, Response filed Jan. 26, 2021 to Notice of Preliminary Rejection mailed Nov. 26, 2020", w/ English Claims, 19 pgs.
"Korean Application Serial No. 10-2021-7022338, Notice of Preliminary Rejection mailed Oct. 27, 2021", W/English Translation, 7 pgs.
"Korean Application Serial No. 10-2021-7022338, Response filed Dec. 27, 2021 to Notice of Preliminary Rejection mailed Oct. 27, 2021", w/English Claims, 20 pgs.
Castelluccia, Claude, et al., "EphPub: Toward robust Ephemeral Publishing", 19th IEEE International Conference on Network Protocols (ICNP), (Oct. 17, 2011), 18 pgs.
Fajman, "An Extensible Message Format for Message Disposition Notifications", Request for Comments: 2298, National Institutes of Health, (Mar. 1998), 28 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.
Shein, Esther, "Ephemeral Data", Communications of the ACM, vol. 56, No. 9, (Sep. 2013), 3 pgs.
Sonja, Utz, "Snapchat Elicits More Jealousy than Facebook: A comparison of Snapchat and Facebook Use", (Nov. 3, 2015).
Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.
"Chinese Application Serial No. 202211231362.2, Office Action mailed Nov. 24, 2023", w/ English Translation, 6 pgs.
"Chinese Application Serial No. 202211231362.2, Response filed Apr. 9, 2024 to Office Action mailed Nov. 24, 2023", W/English Claims, 46 pgs.

\* cited by examiner

MESSAGING ACHIEVEMENT PICTOGRAPH DISPLAY SYSTEM

CLAIM OF PRIORITY

This application is a continuation of U.S. patent application Ser. No. 15/929,511, filed May 6, 2020, which application is a continuation of U.S. patent application Ser. No. 15/098,630, filed on Apr. 14, 2016, now issue as U.S. Pat. No. 10,686,899, which claims the benefit of priority of U.S. Provisional Application No. 62/318,950, filed on Apr. 6, 2016, each of which is hereby incorporated by reference in their entireties.

TECHNICAL FIELD

Embodiments of the present disclosure relate generally to mobile computing technology and, more particularly, but not by way of limitation, to a messaging achievement pictograph display system.

BACKGROUND

In recent years, mobile devices, wearable devices, smart devices, and the like have pervaded nearly every aspect of modern life. Emojis are a popular form of expression in digital communications. As a result of this popularity, there is an ever-increasing variety of emoj is for a wide variety of expressions.

BRIEF DESCRIPTION OF THE DRAWINGS

Various ones of the appended drawings merely illustrate example embodiments of the present disclosure and should not be considered as limiting its scope.

Figure 1:
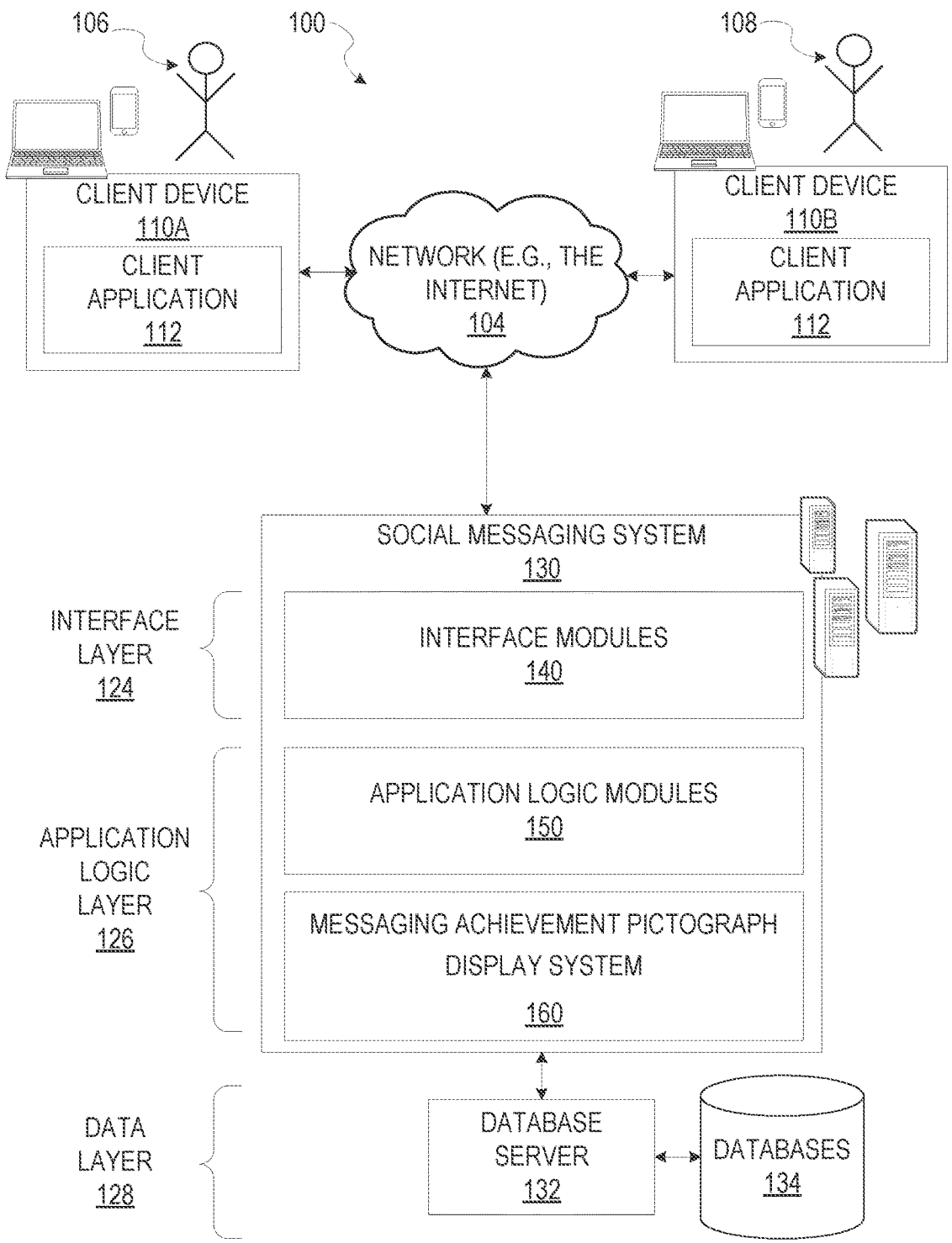
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Person to person communication can frequently involve the use of text messages, picture messages and video messages. A social messaging system may facilitate these communications. Additionally, a social messaging system may directly receive messages from a user. However, the user may, knowingly or unknowingly, fall out of touch with other contacts that the user had frequent communication with. Alternatively, the user may not take advantage of various features of the messaging system because the user does not recognize the function of the features. Previously existing systems allow for various forms of messaging but fail to provide adequate encouragement for the user to communicate with contacts that have recently gone "stale" due to inactivity or where the user does not take advantage of helpful features of the social messaging system.

In various embodiments described herein, to encourage user participation in messaging, pictographs may be displayed to the user to symbolize an achievement related to messaging. Each pictograph may be one of a vast number of emojis, and the display is linked to the type of achievement fulfilled by the user. In order to assess whether the achievement is fulfilled, the social messaging system may receive a message activity communication from a client device, access messaging activity from various databases, determine a messaging score associated with the achievement pictograph, determine whether the message activity communication dictates an adjustment of the message activity score, further determine whether the message activity score transgresses a first threshold activity score, and display the achievement pictograph.

In additional example embodiments, the achievement pictographs may be ephemeral and the system can access deletion data that designates when the display of the pictograph may be removed. For example, the achievement pictograph may be removed if the message activity score falls below a certain value (e.g. transgresses a second activity threshold). The system can further notify a user, about a new achievement pictograph or the removal of an achievement pictograph by way of a notification window on a client device.

In an example embodiment, a user may send a message to a contact using a social messaging system. Some systems will additionally receive a message activity communication that contains data about the message. Within the social messaging system, the message achievement pictograph display system uses this data to adjust a message activity score related to messages sent between the user and the contact. In some embodiments, the message achievement pictograph display system further compares the adjusted message activity score to a first threshold activity score. If the message activity score transgresses the first threshold activity score (e.g. passes a threshold), then the contact is designated as a "best friend" of the user and an achievement pictograph is displayed on the client device. The user can be notified of the new "best friend" status of the contact using a notification window. At a later time, if the message activity score transgresses a second threshold activity score (e.g. falls below a second threshold), the contact no longer qualifies as a "best friend" and the achievement pictograph is removed from display. Other embodiments may manage achievements in other ways in accordance with other embodiments described herein.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transmission of messages between client devices and servers) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. Additional functional modules and engines may be used with a social messaging system 130, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface module(s) (e.g., a web server) 140, which receive requests from various client-computing devices and servers, such as client devices 110A and 110B executing client application 112. In response to received requests, the interface module(s) 140 communicate appropriate responses to requesting devices via a network 104. For example, the interface module 140 can receive requests such as Hypertext Transfer Protocol (HTTP) requests, or other web-based Application Programming Interface (API) requests.

The client devices 110A and 110B can execute conventional web browser applications or applications (also referred to as "apps") that have been developed for a specific platform to include any of a wide variety of mobile computing devices and mobile-specific operating systems (e.g., IOS™ ANDROID™, WINDOWS® PHONE). In an example, the client device(s) 110 are executing the client application 112. The client application 112 can provide functionality to present information to a first user 106 or a second user 108 and communicate via the network 104 to exchange information with the social messaging system 130. Each of the client devices 110A and 110B can comprise a computing device that includes at least a display and communication capabilities with the network 104 to access the social messaging system 130. The client devices 110A and 110B comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User(s) 106 can be a person, a machine, or other means of interacting with the client devices 110A and 110B. In some embodiments, the users 106 and 108 interact with the social messaging system 130 via the client devices 110A and 110 B.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic module(s) 150, which, in conjunction with the interface module(s) 140, generate various user interfaces with data retrieved from various data sources or data services in the data layer 128. Individual application logic module(s) 150 may be used to implement the functionality associated with various applications, services, and features of the social messaging system 130. For instance, a social messaging application can be implemented with one or more of the application logic module(s) 150. The social messaging application provides a messaging mechanism for users of the client devices 110A and 110B to send and receive messages that include text and media content such as pictures and video. The client devices 110A and 110B may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. In various embodiments, other applications and services may be separately embodied in their own application server module(s) 150.

As illustrated in FIG. 1, the social messaging system 130 includes a messaging achievement pictograph display system 160. In various embodiments, the messaging achievement pictograph display system 160 can be implemented as a standalone system operating on a separate computing device with one or more processors, and is not necessarily included in the social messaging system 130. In some embodiments, the client devices 110A and 110B include a portion of the messaging achievement pictograph display system 160. (e.g., a portion of the messaging achievement pictograph display system 160 included independently or in the client application 112). In embodiments where the client devices 110A and 110B includes a portion of the messaging achievement pictograph display system 160, the client devices 110A and 110B can work alone or in conjunction with the portion of the messaging achievement pictograph display system 160 included in a particular application server or included in the social messaging system 130.

Figure 2:
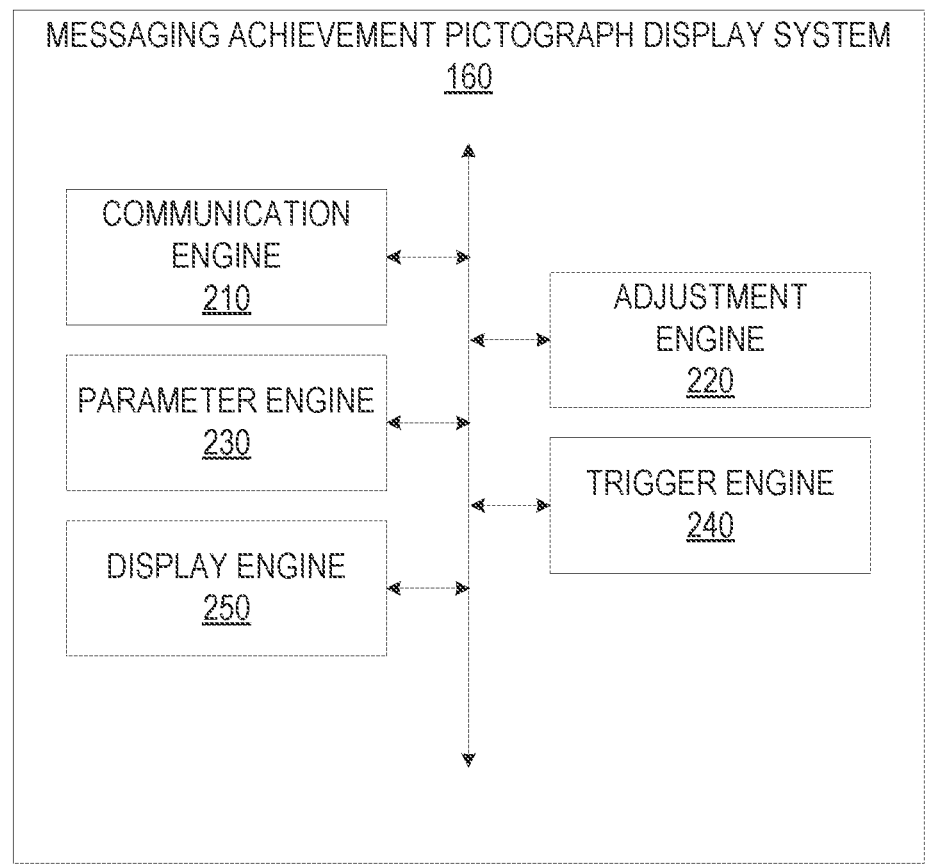
FIG. 2 is a block diagram illustrating an example embodiment of a messaging achievement pictograph display system, according to some example embodiments.

FIG. 2 is a block diagram 200 of the messaging achievement pictograph display system 160 according to some example embodiments. Other embodiments may be implemented using various other structures. The messaging achievement pictograph display system 160 is shown to include a communication engine 210, an adjustment engine 220, a parameter engine 230, a trigger engine 240, and a display engine 250. All, or some, of the modules 210-250 communicate with each other, for example, via a network coupling, shared memory, and the like. Each module of the modules can be implemented as a single module, combined into other modules, or further subdivided into multiple modules. Other modules not pertinent to example embodiments can also be included, but are not shown.

The communication module 210 provides various communications functionality. For example, in some embodiments the communication engine 210 receives messaging activity data from the client devices 110A and 110B and accesses databases 134 using the database server 132 to retrieve message indicators and parameter indicators. In a specific example, the communication module retrieves a message activity communication that contains data related to a message sent from the first user 106 and the second user 108. The communication engine 210 additionally retrieves, from the databases 134, a message indicator containing a message activity score related to the data within the message activity communication. Finally, the communication engine 210 retrieves a parameter indicator containing a first threshold activity score related to the message activity score and an achievement pictograph. The communication module 210 further exchanges network communications with the database server 132, and the client devices 110A and 110B. The information retrieved by the communication module 210 includes data associated with the user (e.g., member profile data from an online account or social network service data) or other data to facilitate the functionality described herein.

The adjustment engine 220 provides functionality to determine a score adjustment for a message activity score and make the adjustment. For example, the adjustment engine 220 determines, based on data contained in a message activity communication, that a message activity score should be increased or decreased by a certain amount. Continuing the example above, the adjustment engine 220 may determine that a message activity score related to the first user 106 and the second user 108 should be increased from a lower score to a higher score based on the message activity communication.

The parameter engine 230 provides functionality to match a parameter indicator to a message indicator, determine whether a message activity score transgresses a first or a second threshold activity score, and cause the display engine 250 to display an achievement pictograph. For example, the parameter engine may determine that a parameter indicator matches a message indicator and that a message activity score included in the message indicator transgresses a first threshold activity score because the message activity score is equal to or greater than the first threshold activity score.

The parameter engine 230 then communicates with the display engine 250 to cause the display engine 250 to display the achievement pictograph.

Continuing the example above, the parameter engine 230 determines that a parameter indicator matches the message indicator and compares the message activity score that was adjusted due to the message to a first threshold activity score. Transgressing the first threshold activity score may indicate that an achievement pictograph be displayed showing that the first user 106 and the second user 108 (e.g. accounts associated with users) are "best friends." In this example, the parameter engine 130 determines that the message activity score does transgress the first threshold activity score, and the parameter engine 130 further causes the display engine to display an achievement pictograph that is included in the message indicator.

The trigger engine 240 provides functionality to display a notification to a user about an achievement pictograph display or initiate removal of an achievement pictograph. For example, the trigger engine notifies the first user 106 that an achievement pictograph will be deleted unless the first user 106 takes a specific action, such as sending a message to the second user 108. The trigger engine can further determine that a specific type of achievement pictograph will be removed after a certain day and can cause the display engine 250 to remove the achievement pictograph after the day is over.

The display engine 250 provides various presentation and user interface functionality operable to interactively present and receive information to and from the user. For example, the display engine 250 is utilizable to present or remove achievement pictographs based on communications from the parameter engine 230 or the trigger engine 240. In various embodiments, the display engine 250 presents or causes presentation of information (e.g., visually displaying information on a screen, acoustic output, haptic feedback). The process of interactively presenting information is intended to include the exchange of information between a particular device and the user. The user may provide input to interact with the user interface in many possible manners, such as alphanumeric, point based (e.g., cursor), tactile, or other input (e.g., touch screen, tactile sensor, light sensor, infrared sensor, biometric sensor, microphone, gyroscope, accelerometer, or other sensors). The display engine 250 provides many other user interfaces to facilitate functionality described herein. The term "presenting" as used herein is intended to include communicating information or instructions to a particular device that is operable to perform presentation based on the communicated information or instructions.

In addition to the embodiments described above, a messaging achievement pictograph display system 160, in some embodiments, tracks multiple achievements scores and thresholds associated with two or more user accounts. For example, one achievement score and associated threshold(s) may be associated with message frequency, one achievement and associated threshold(s) may be associated with a length of time that accounts have gone without allowing a timing threshold to expire between communications, one achievement and associated threshold(s) may be associated with particular types of communications or communication metadata (e.g. location, filters, message content type, etcetera). In various other embodiments, any other such achievement scores and associated thresholds may be used. Additionally, such scores may be tracked for associations or relationships between any number of users or user accounts in a system, such that any account that has communicated with any other account may generate one or more achievement scores associated between those accounts.

Figure 3:
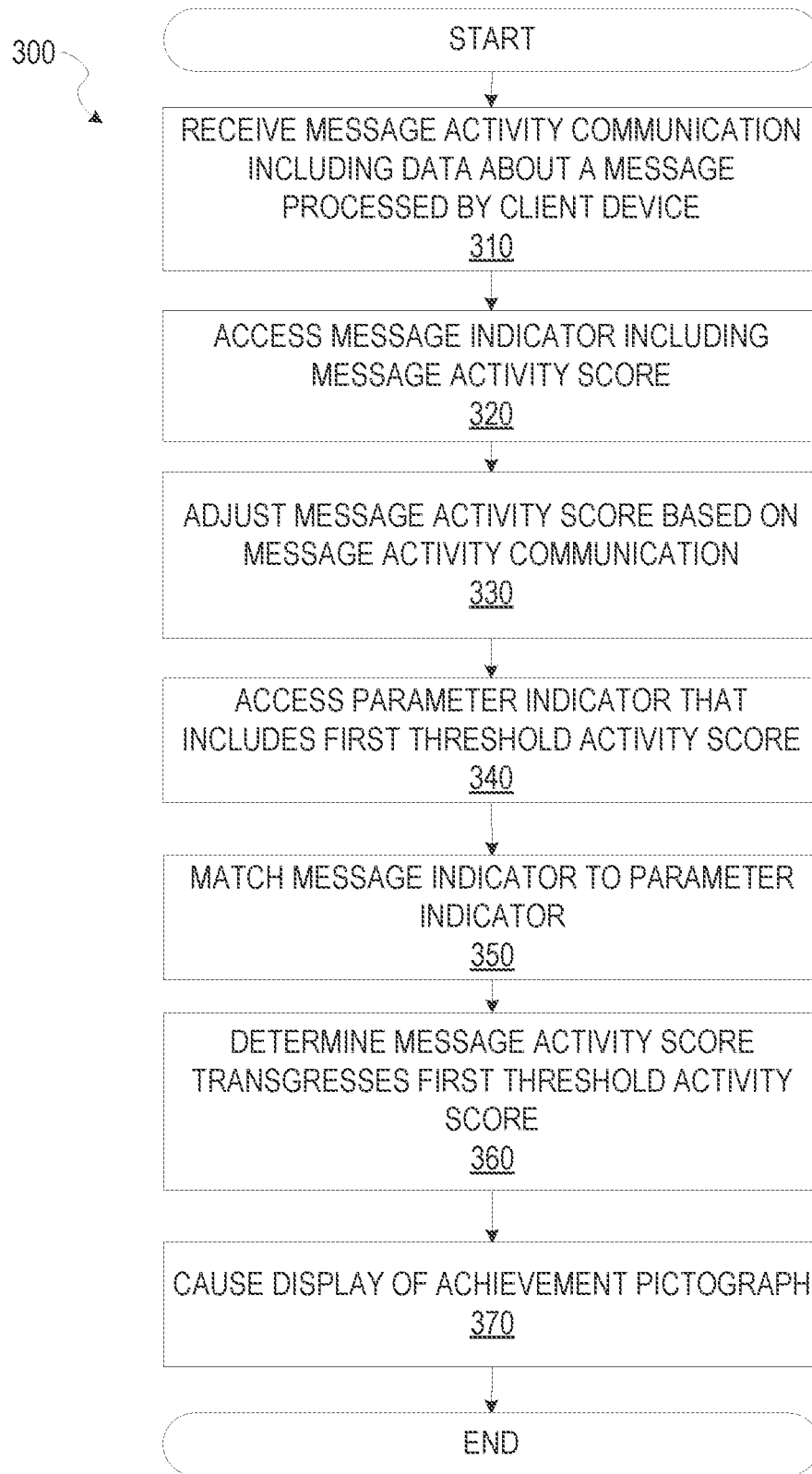
FIG. 3 is a flow diagram illustrating an example method of causing display of a messaging achievement pictograph based on messaging activity, according to some example embodiments.

FIG. 3 is a flow diagram illustrating an example method 300 for causing display of a messaging achievement pictograph based on messaging activity. The operations of the method 300 may be performed by components of the messaging achievement pictograph system 160, and are so described below for the purposes of illustration.

At operation 310, the communication engine 210 receives, from the first client device 110A, a message activity communication that includes data about a message. The message is a communication sent from or received by the first client device 110A correlated with the first user 106 and may include a textual message, image message, or video message that is sent to or received from the second client device 110B correlated with the second user 108. The message could further include data that the first user 106 submits to the social messaging system 130 using the client application 112. The communication engine 310 may receive the message activity over the network 104 and through the social messaging system 130.

In an example embodiment, the first user 106 sends, using the client application 112 on the first client device 110A, an ephemeral video message with an automatic deletion trigger to the second client device 110B. The client application 112 on the first client device 110A additionally sends a message activity communication to the communication engine 210, the message activity communication including data about the message. In this example, the data could include information that the message is an ephemeral video message that is seven seconds length and containing an additional image overlay as well as a text overlay.

In another example embodiment, the first user 106 may take a digital photograph, using the client application 112 on the first client device 130, of the first user's pet cat, and scan the image, such that the image is uploaded to the social messaging system 130. In this example, the communication engine 130 similarly receives a message activity communication about the message (e.g. image) to the social messaging system 130. The data in this example could include information about when the image was taken and that the client application 112 has recognized the image as being a picture of a cat.

At operation 320, the communication engine 210 accesses a message indicator from one or more of the databases 134 using the database server 132. The message indicator includes a message activity score (e.g. a numerical value between 0 and 100) that is based on past messages sent from or received by the client device.

In some example embodiments, the message activity score may be based on the volume and form of messages exchanged between the first client device 110A and the second client device 110B. For example, the message activity score from the above example involving the seven second video ephemeral message may only be based on ephemeral video messages occurring between the first user 106 and the second user 108. In the other example involving the picture of the cat, the messaging activity may only be based on images uploaded from the first client device 110A to the social messaging system 130 that the client application 112 recognizes as being an image of a cat.

In operation 330, responsive to the communication engine 210 receiving the message activity communication and accessing a message activity score from one or more databases 134, the adjustment engine 220 adjusts the message activity score based on the message activity communication. For example, the adjustment engine 220 may determine that the data about the message processed by the first user device 110A and included in the message activity communication has a numerical weight in relation to the message activity score based on the type of message and length of message, among other factors. In the example, the numerical weight determined by the adjustment engine 220 may be added directly to the message activity score associated with the message indicator.

In an example embodiment, several message activity scores may be accessed by the communication engine 210 and adjusted by the adjustment engine 220 based on the same message activity communication. In the previous example involving the seven second ephemeral video message, a first message activity score may be based on at least one video message being sent from the first user 106 to the second user 108 and at least one video message being sent from the second user 108 to the first user 106 within the past 24 hours. Additionally, a second message activity score may be based on the total number of text, image, and video messages exchanged between the first user 106 and the second user 108. Thus, the adjustment engine 220 may make or abstain from making adjustments to the first message activity score or the second activity score based on the content of the message. In this example, the adjustment engine 220 adds a weighted value to the first message activity score since the data about the ephemeral video message details that the message was sent from the first client device 110A within the last 24 hours. The adjustment engine 220 additionally adds a weighted value to the second message activity score since the ephemeral video message counts as any message between the first user 106 and the second user 108 over the client application 112.

In some embodiments, the weighted value added to the score may have a time limit condition such that the adjustment engine 220 automatically removes the weight previously added after a designated amount of time. For example, in the above illustration, the first message activity score is only adjustable by the adjustment engine 220 if the ephemeral video message was sent or received by the first client device 110A in the past 24 hours. After 24 hours elapses, the adjustment engine may automatically remove the weight added to the first messaging score that was based on the messaging activity communication. Thus, adjustments to a message activity score may have time limits and "expire" at the end of the time limit. In other embodiments, any other such time limit conditions may be used (e.g. 30 minutes, one hour, one week, etcetera.)

At operation 340 and 350, responsive to the adjustment engine 220 making an adjustment to the message activity score, the communication engine 210 accesses a parameter indicator (e.g. a unique data marker) that includes a first threshold activity score and an achievement pictograph and the parameter engine 230 matches the message indicator to the parameter indicator. The parameter indicator may be located in at least one database 134 and accessible by the communication engine 210 over the database server 132. In some embodiments, the communication engine 210 may access more than one parameter indicator and in further example embodiments, the parameter engine 230 may determine that more than one parameter indicator matches the message indicator.

In the above example involving the user taking a picture of the cat, the communication engine 210 may access a parameter indicator that is linked to a threshold activity score. The threshold activity score in this example, is based on a number of uploads of cat images using the client application 112 in order to receive an achievement. In the case where the message activity score is based on the number of cat images that the first user 106 has uploaded to the social messaging system 130 using the client application 112, the parameter engine 230 will determine that the parameter indicator matches the message indicator.

In operation 360, the parameter engine 230 further determines the message activity score transgresses the threshold activity score. In example embodiments, the message activity score may transgress the threshold activity score by exceeding a maximum activity score, or by falling below a minimum activity score.

In the above example involving the user taking a picture of the cat, the threshold activity score may designate an achievement pictograph be displayed if five images of cats are uploaded by a client device. The first user 106, in this example, has just uploaded, using the client application 130, her fifth picture of a cat with the first user device 110A. The message activity score, as adjusted by the adjustment engine 320, would therefore have a score of 5 since a weight of 1 would be added to the message activity score by the adjustment engine for every cat image. In the example, the parameter engine 330 determines that the message activity score of 5 transgresses the threshold activity score of 5.

In operation 370, the display engine 250, responsive to the parameter engine 230 determining the message activity score transgresses the threshold activity score, displays the achievement pictograph included in the parameter indicator on the first client device 110A. In some example embodiments, the trigger engine 240, responsive to the display of the pictograph, retrieves a notification image from one or more of the databases 134 over the database server 132 and causes the display engine 250 to display the notification on the first client device 110A.

For example, in response to the message activity score of 5 transgressing the threshold activity score for images of a cat uploaded to the social messaging system 130, display engine 250 accesses the pictograph that is included in the message indicator and cause display of the pictograph within the client application 112 on the first client device 110A. Additionally, the trigger engine 240, responsive to the display of the pictograph, accesses a notification image that describes the achievement to the first user 106 and causes the display engine 250 to display the notification.

In the example, the first user 106 views the notification as an automatically generated window within the client application 112 on the client device. The notification displays a textual achievement message to the user, such as "Five Cat Pics Scanned" and may include a display of the achievement pictograph within the notification. In this case, the achievement pictograph could be a cartoon image of the face of a cat.

The method of display of the achievement pictograph may vary across different embodiments of the system. In an example embodiment, the pictograph is displayed in a designated section of the client application 112 for achievement pictographs (e.g. a "trophy case"). In the embodiment, the first user 106 "collects" the achievement pictographs which are aggregated in a display designated for the pictographs. Once a pictograph is collected, it is permanently viewable by the first user 106 within the client application 112. An In another example embodiment, the achievement pictograph may be ephemeral on the client application 112 and the display engine 250 may remove the achievement pictograph at a later time. For example, the display engine 250 may display an achievement pictograph next to a contact information of the second user 108 on a messaging screen of the client application 112 where the achievement pictograph relates to communications between the first user 106 and the second user 108. In this example embodiment, the trigger engine 240 may access deletion data stored on one or more of the databases 134 stored on one or more of the databases, the deletion data designating that the display engine 250 remove the achievement pictograph be removed at a designated time or after a designated amount of time. At the designated time or after the designated amount of time, the trigger engine 240 determines that the achievement pictograph should be deleted and causes the display engine 250 to remove the achievement pictograph from view on the client application 112.

In an example, the messaging achievement pictograph display system causes display of a shamrock on the messaging screen of the client application 112 on a first client device 110A next to contact information of the second user 108 if the first user 106 sends an ephemeral video message about St. Patrick's Day to the second user 108 on March $17^{th}$. The communication engine 210 receives a message activity communication including data about a message sent from the first user 106 to the second user 108. The communication engine further accesses a message indicator related to ephemeral video messages sent on St. Patrick's Day that includes a message score. Since the message activity communication contains data about an ephemeral video message sent on March $17^{th}$ (St. Patrick's Day), the adjustment engine 220 adjusts the message activity score from 0 to 1. The communication engine 210 then accesses a parameter indicator that includes a threshold activity score for the shamrock achievement and the shamrock achievement pictograph. The parameter engine 230 then matches the message indicator the parameter indicator and determines whether the message activity score transgresses the threshold activity score. In this case, since the scores are binary (either there is an ephemeral video message sent on March $17^{th}$ or there is not), the parameter engine 230 determines the message activity score transgresses the threshold activity score and causes the display engine 250 to display the shamrock achievement pictograph next to the contact information of the second user 108 on the messaging screen of the client application 112 on the first client device 110A. The trigger engine 240 may further access notification data and cause the display engine 250 to display a notification window on the client application 112 within the first client device 110A, the notification window notifying the first user 106 about the achievement pictograph. The trigger engine 240 may also access deletion data that designates all achievement pictographs related to St. Patrick's Day should be removed at 12:00 am on March $18^{th}$. Thus at 12 am on March $18^{th}$, the trigger engine would cause the display engine 150 to remove the shamrock achievement pictograph from the messaging screen.

Figure 4:
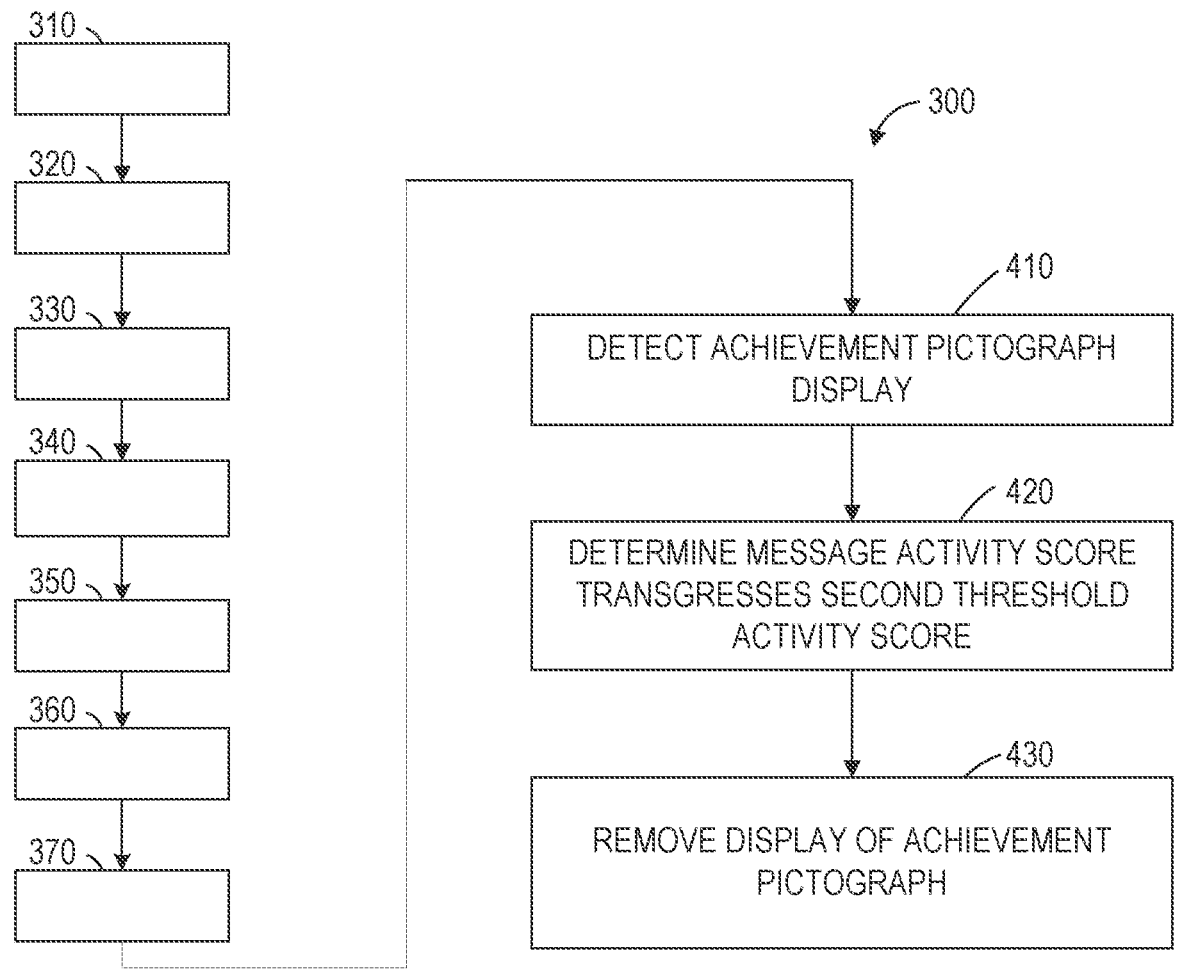
FIG. 4 is a flow diagram illustrating further example operations for causing display of a messaging achievement pictograph, according to some example embodiments.
Figure 5:
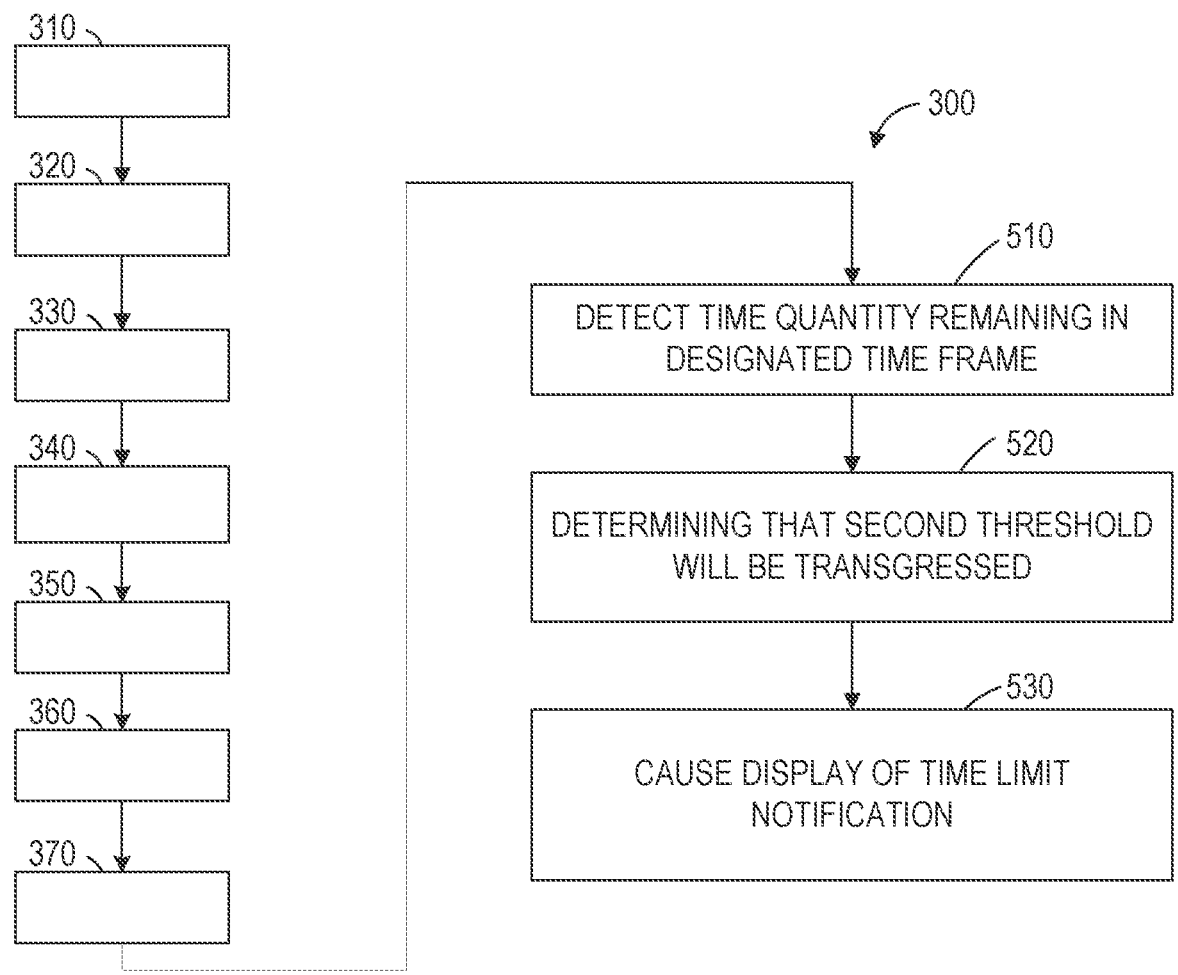
FIG. 5 is a flow diagram illustrating further example operations for causing display of a messaging achievement pictograph, according to some example embodiments.

FIGS. 4 and 5 are flowcharts illustrating additional operations of the messaging achievement pictograph display system 110, according to some example embodiments. In some example embodiments, the method 300 includes additional sub-operations occurring after operation 370. For example, the method 300 may include operations 410, 420, and 430 as depicted in FIG. 4. In some example embodiments, operations 410, 420, and 430 included in the method 300 may be performed as part (e.g., a precursor task, a subroutine, or a portion) of or subsequent to operation 340 of method 300, in which the display engine 250 displays an achievement pictograph on the client application 112 on the first client device 110A.

At operation 410, the parameter engine 230 detects that an achievement pictograph is currently displayed on the client application 112 by the display engine. At 420, the parameter engine 230 further detects that the message activity score that previously transgressed the first activity threshold now transgresses a second activity threshold activity score. Responsive to the message activity score transgressing the second threshold activity score, the parameter engine 230 causes the display engine 250 to remove the achievement pictograph from the client application 112 on the first user device.

In an example embodiment, the display engine 250 may display an achievement pictograph on the messaging screen of the client application 112 next to contact information of the second user 108, the achievement pictograph awarded to friends (e.g. saved contacts) of the second user that are determined to be one of the ten "closest" friends to the user. The "closeness" of friends to the second user 108 may be determined, using a message activity score, by the form, frequency, and timeframe of messages between the second user 108 and a friend. For example, the adjustment engine 220 could determine a higher weight to video messages from the second user 108 to the friend than text messages, resulting in the adjustment engine 220 raising the message activity score by a greater degree for a video message than for a text message.

In the above example, the first threshold activity score would be the message activity score needed at a previous time for the first user to be in the "top ten" friends for the second user 108. Since the pictograph is displayed, the first user's 106 message activity score transgressed the first threshold activity score at the previous time and allowed the first user 106 to receive the achievement. However, since the "closeness" between the second user 108 and the user's friends may change over time, first threshold activity score from the previous time may change to a second threshold activity score at a current time. For instance, if the second user 108 has become much more active on the social messaging system 130, the second user 108 may have added new friends or increased messaging frequency with other friends. In this example, the first user's 106 message activity score related to closeness with the second user transgresses the second threshold activity score by falling below the score. The parameter engine 230 determines that the message activity score has transgressed the second threshold score, and causes the display engine 250 to remove the "top ten friends" achievement pictograph that was displayed on the client application 112 on the first user device 112. Thus, the achievement pictographs may be removed based on a designated time, a timeframe, or based on activity by other users.

In some example embodiments, operations 510, 520, and 530 included in the method 300 may be performed as part (e.g., a precursor task, a subroutine, or a portion) of operation 340 of method 300, in which the display engine 250 displays an achievement pictograph on the client application 112 on the first client device 110A.

In operation 510-520, the trigger engine 240 detects a specific quantity of time remaining in a designated time frame and determines that, after expiration of the time frame, a second threshold quantity will be transgressed such that the parameter engine 230 will remove the achievement pictograph. In operation 530, the trigger engine 240 causes the display engine 250 to display a notification window warning the user that the achievement pictograph will be removed after expiration of the time limit and displaying the time of expiration.

For example, in the above illustration involving the seven second ephemeral video message, the parameter engine 230 detects that the display engine 250 displays an achievement pictograph on the client application 112 on the first client device 110A in response to ephemeral video messages being exchanged between the first client device 110A and the second client device 110B. If the first user 106 has failed to send an ephemeral video message to the second user 108 for 24 hours, this may cause the adjustment engine 120 to lower the message activity score such that the parameter engine 130 determines that the message activity score transgresses a second threshold activity score and causes the display engine 150 to remove the achievement pictograph. In the example, if the first user 106 has failed to send an ephemeral video message to the second user 108 for 23 hours and 30 minutes, the trigger engine 240 causes the display engine 250 to display a notification window warning the user that the pictograph will be removed in 30 minutes unless the first user 106 sends an ephemeral video message to the second user 108.

Figure 6:
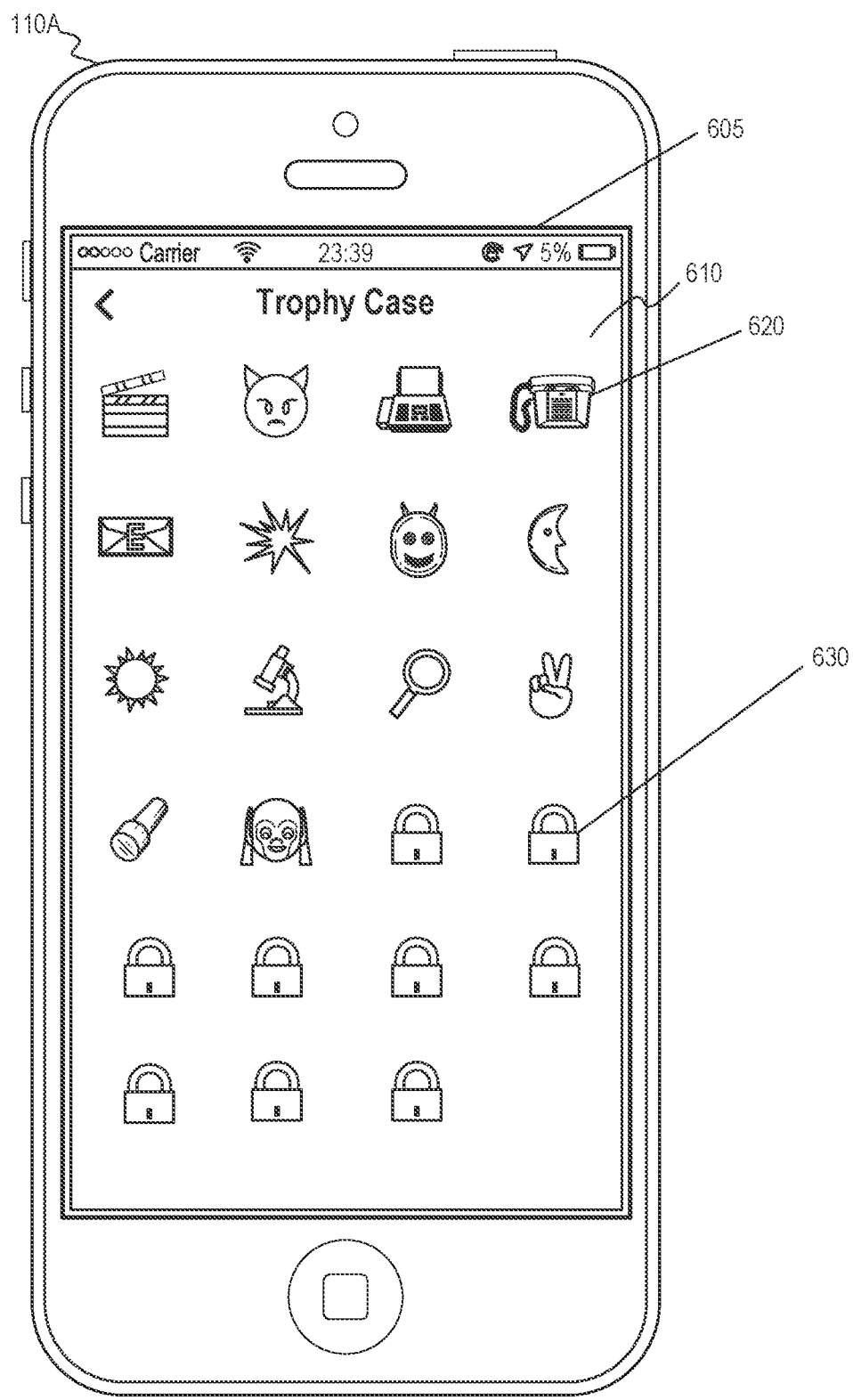
FIGS. 6 and 7 are diagrams illustrating an example of a graphical user interface that is configured to display pictographs and a notification window to show when a new pictograph is added.
Figure 7:
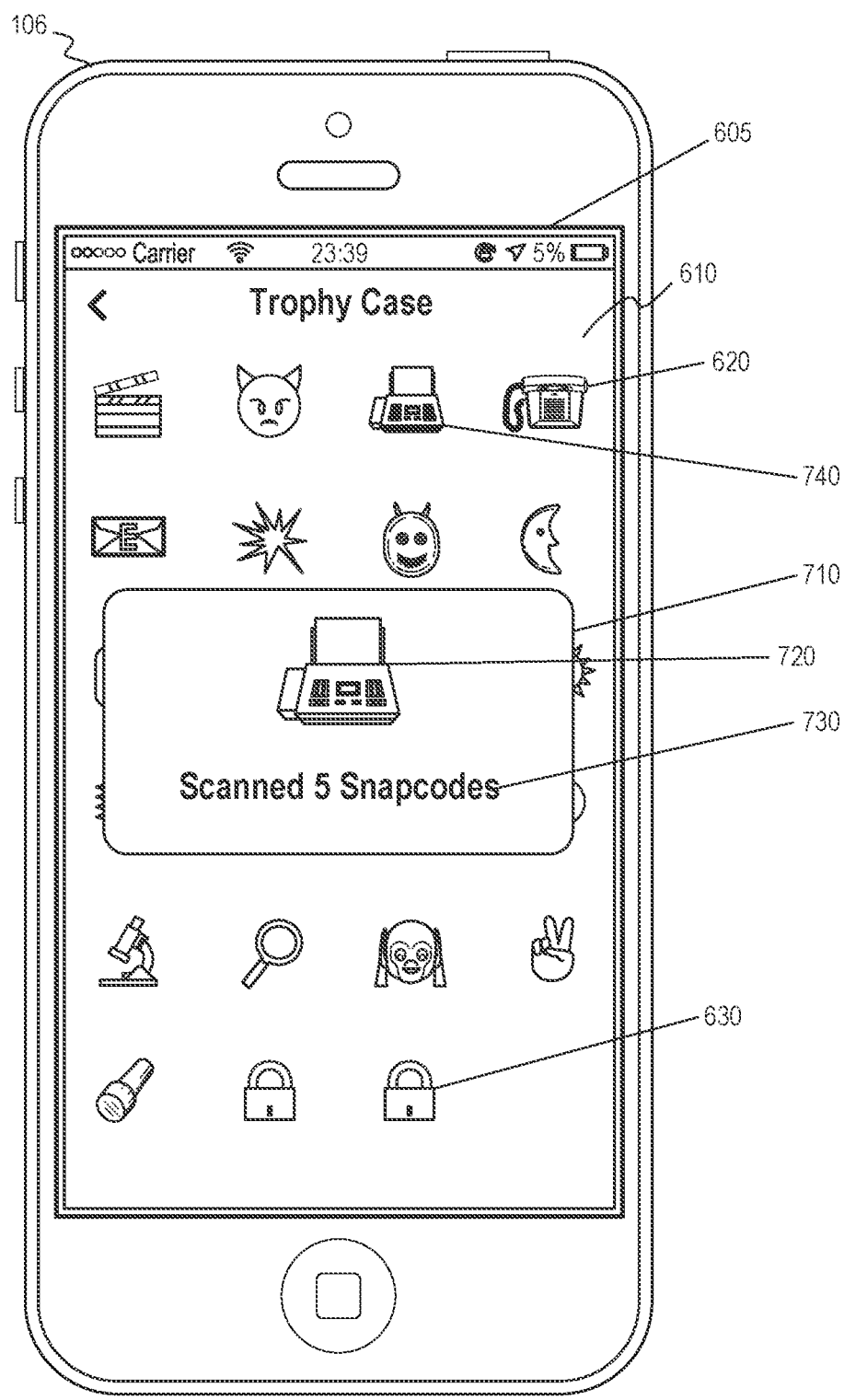

FIGS. 6 and 7 are interface diagrams that display the client application 112 running on the first user device 110A. The first user device 110A may include a trophy interface 610 that is displayed on a graphical user interface 605 of the first user device 110A. Within the trophy interface 610, various achievement pictographs 620 in the form of emojis may be displayed. Further, the trophy interface 610 may also contain pictographs that represent achievement pictographs that have not yet been unlocked 630 in the form of a "lock emoji." When a new achievement pictograph is unlocked, a notification window 710 within the trophy interface may be displayed containing an image of the achievement pictograph 720, as well as a description of the achievement 730. The achievement pictograph may now further be visible in the trophy interface 740.

Figure 8:
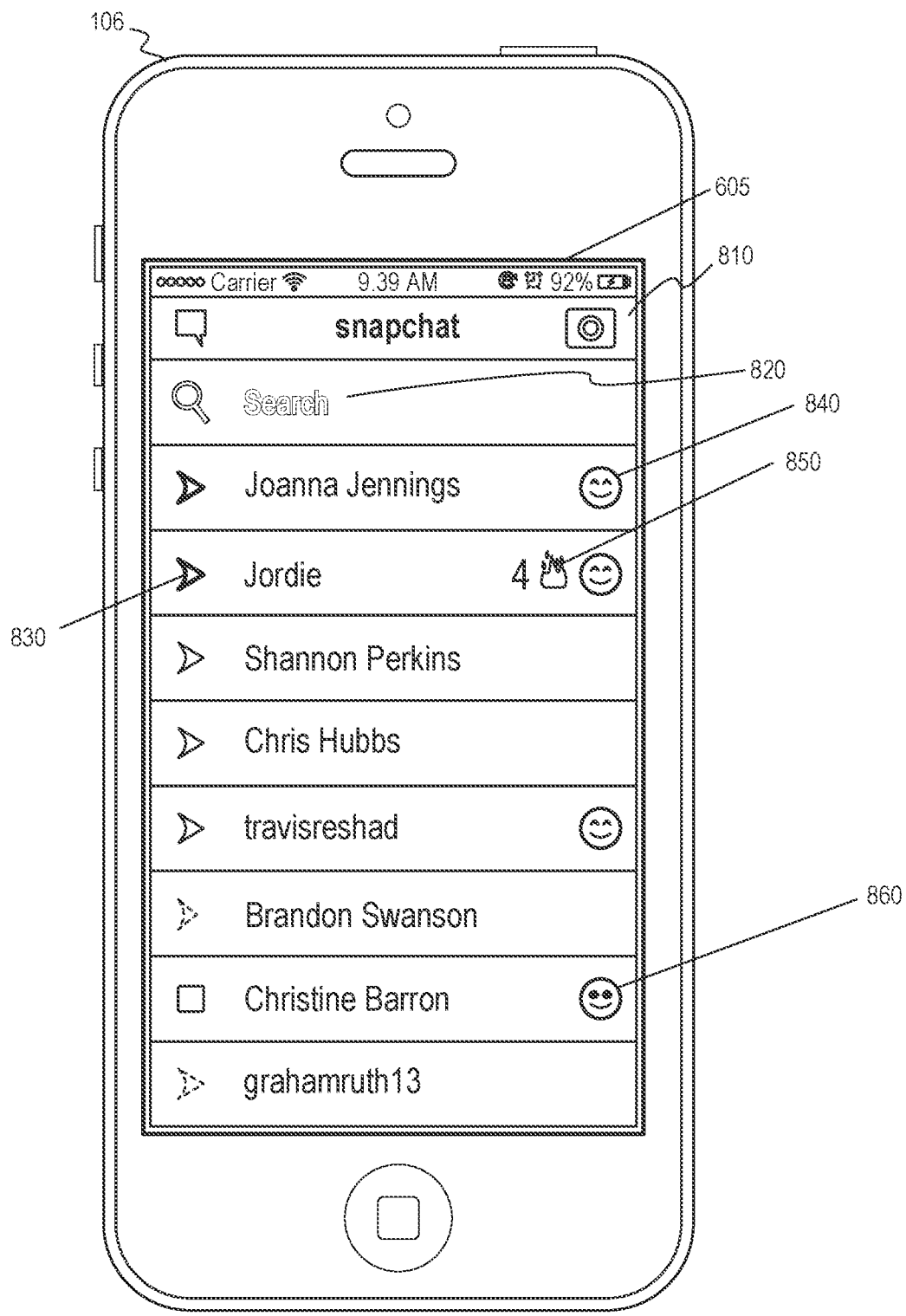
FIGS. 8 and 9 are diagrams illustrating an example of a graphical user interface that is configured to display messages and pictographs as well as a notification window to show when a currently displayed pictograph will be removed.
Figure 9:
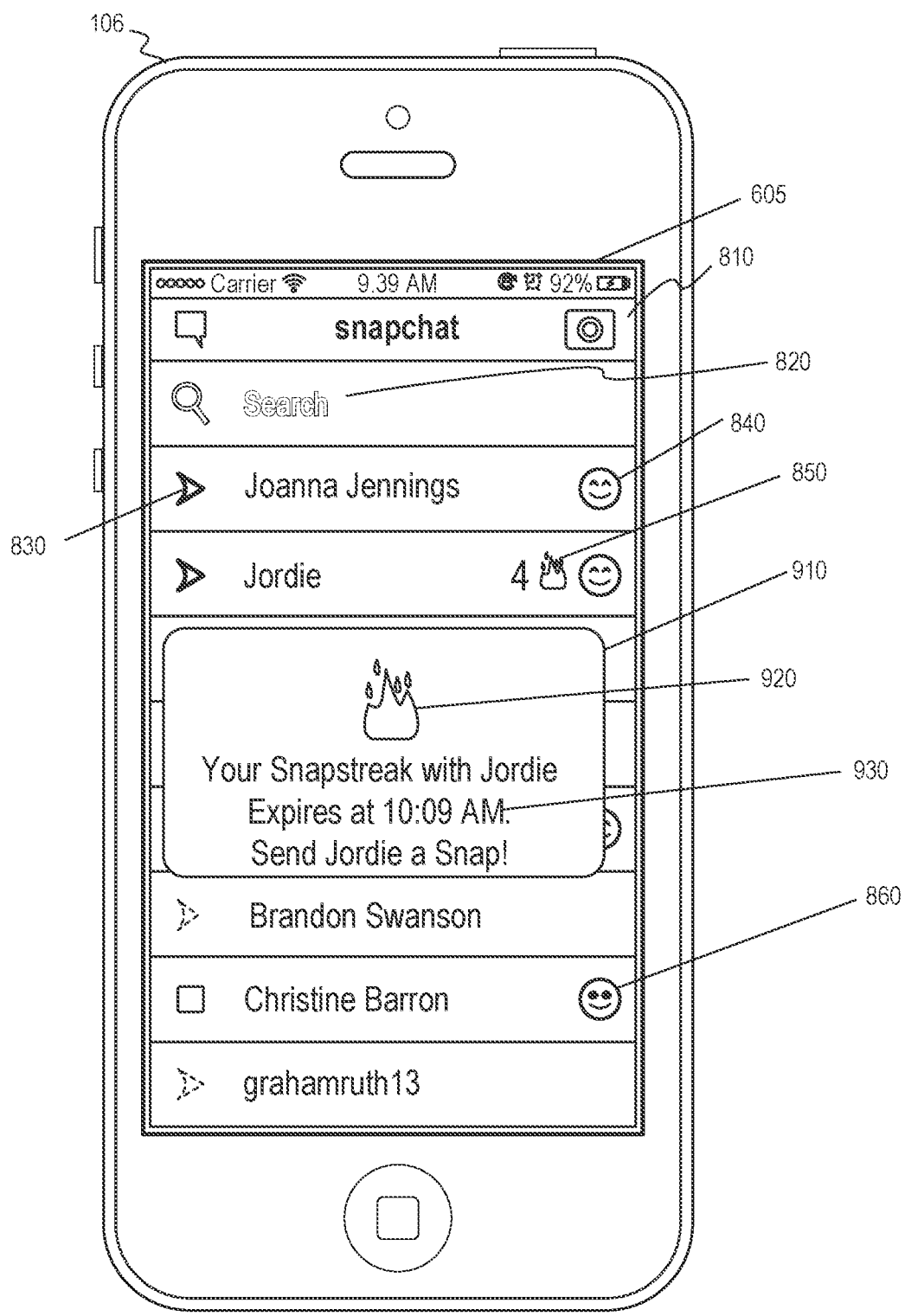

FIGS. 8 and 9 are also interface diagrams that display aspects of a client application such as the client application 112 running on the first user device 110A. The first user device 110A may include a messaging interface 810 that is displayed on the graphic user interface 605. The messaging interface may include a search box 820 in which the first user 106 can search for contacts based on contact information. The messaging interface 810 additionally includes a list of contacts with displays the contact information 830 of each contact including a name of the contact and an icon that shows the type of message exchanged with the contact (an arrow represents an ephemeral video message and a block represents a text message). Also displayed on the messaging interface are achievement pictographs in the form of emojis 840, 850. The smile with closed eyes emoji 840 represents that the first user 106 is "best friends" with the contact, in that the contact is in the top ten friends of the first user 106 in terms of "closeness" based on the messages exchanged. In contrast, an emoji with sunglasses on represents that the contact is "best friends" with the first user 106 but the first user is not "best friends" with the contact (the first user 106 is in the contact's top ten friends, but the contact is not in the first user's 106 top ten friends).

The "fire" emoji represents that the user and the contact are on a "snap streak" in that first user 106 and the contact have each sent each other an ephemeral video message in the last 24 hours. The "4" designation shows that this is the fourth continuous iteration of a snap streak between first user 106 and the contact, meaning that the first user 106 and the contact have each exchanged four messages with each other without 24 hours elapsing between messages. If a snap streak is about to expire, a notification display window 910 may be displayed with an image of the snap streak emoji 920 and a message 930 detailing how the user can avoid letting the snap streak expire.

When these effects are considered in aggregate, one or more of the methodologies described herein may obviate a need for certain efforts or resources that otherwise would be involved in messaging achievement pictograph display. Efforts expended by the user 132 in asset allocation evaluation may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Modules, Components, and Logic

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Software Architecture

Figure 10:
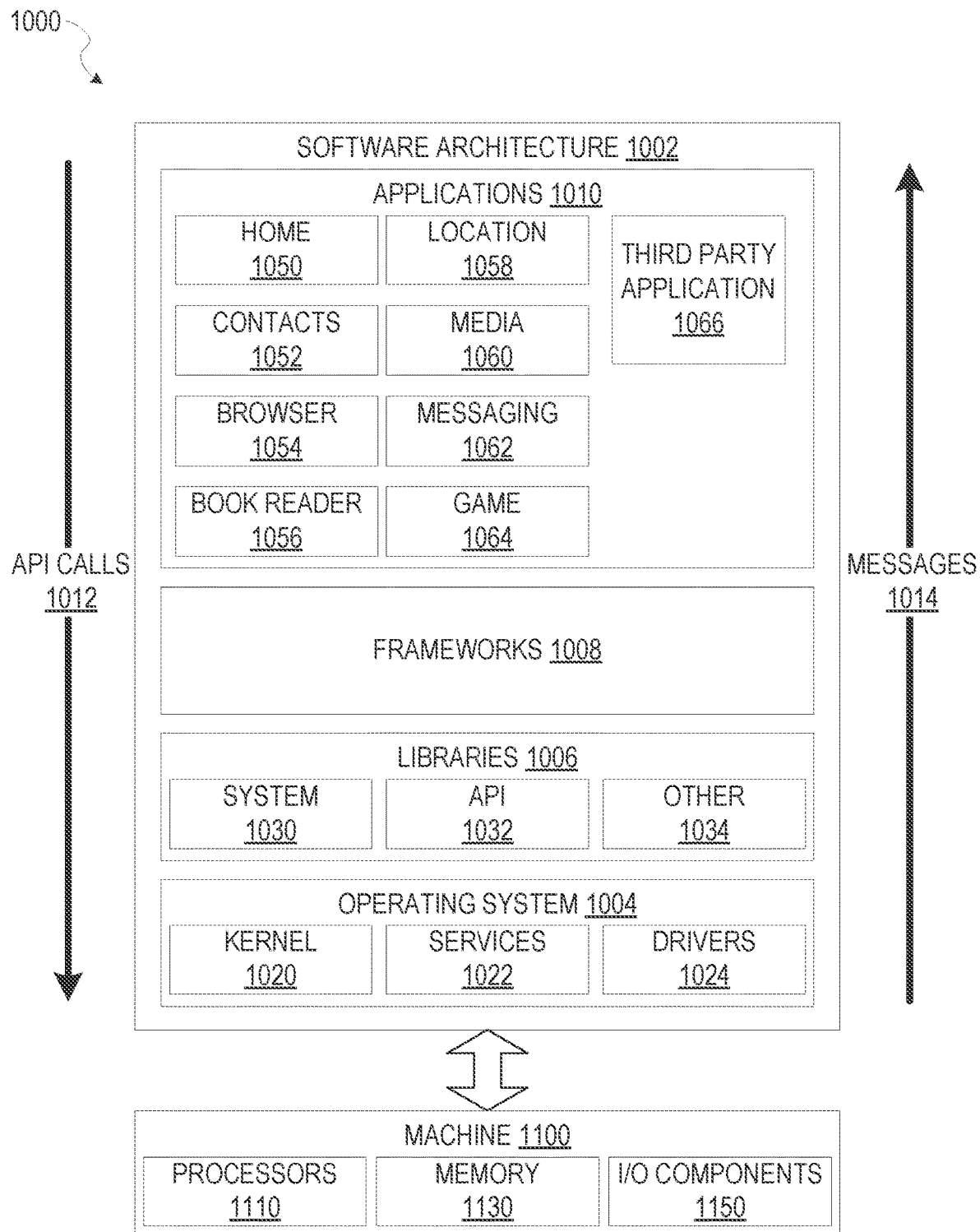
FIG. 10 is a block diagram illustrating an example of a software architecture that may be installed on a machine, according to some example embodiments.

FIG. 10 is a block diagram 1000 illustrating an architecture of software 1002, which can be installed on any one or more of the devices described above. FIG. 10 is merely a non-limiting example of a software architecture, and it will be appreciated that many other architectures can be implemented to facilitate the functionality described herein. In various embodiments, the software 1002 is implemented by hardware such as a machine 1100 of FIG. 11 that includes processors 1110, memory 1130, and I/O components 1150. In this example architecture, the software 1002 can be conceptualized as a stack of layers where each layer may provide a particular functionality. For example, the software 1002 includes layers such as an operating system 1004, libraries 1006, frameworks 1008, and applications 1010. Operationally, the applications 1010 invoke application programming interface (API) calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating system. In this example, the third party application 1066 can invoke the API calls 1012 provided by the operating system 1004 to facilitate functionality described herein.

Example Machine Architecture and
Machine-Readable Medium

Figure 11:
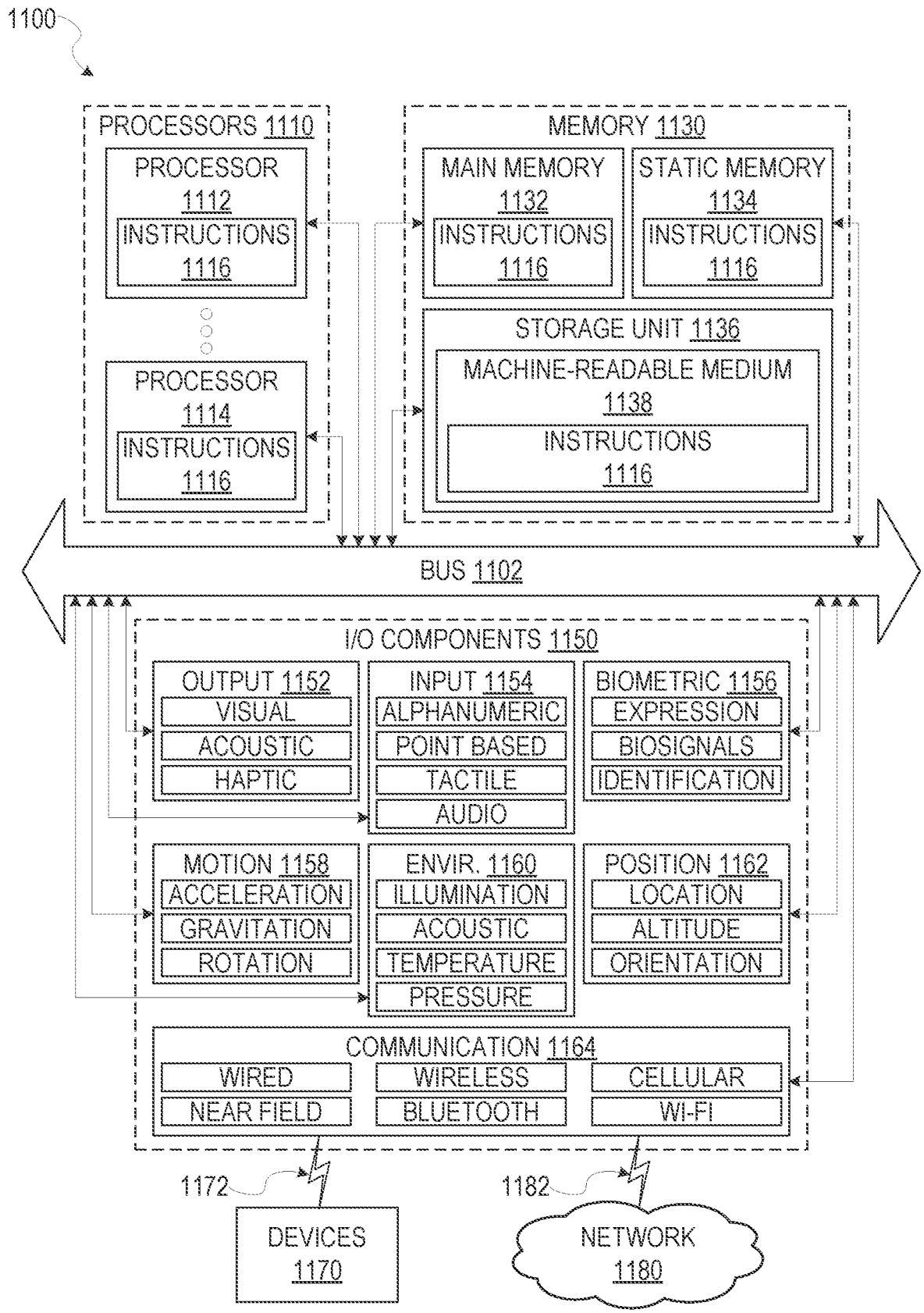
FIG. 11 is a block diagram presenting a diagrammatic representation of a machine in the form of a computer system within which a set of instructions may be executed for causing the machine to perform any of the methodologies discussed herein, according to an example embodiment.

FIG. 11 is a block diagram illustrating components of a machine 1100, according to some embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein can be executed. In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1112 and a processor 1114 that may execute the instructions 1116. The term "processor" is intended to include multi-core processors that may comprise two or more independent processors (also referred to as "cores") that can execute instructions contemporaneously. Although FIG. 11 shows multiple processors, the machine 1100 may include a single processor with a single core, a single processor with multiple cores (e.g., a multi-core processor), multiple processors with a single core, multiple processors with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown in an example embodiment to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., an accelerometer), gravitation sensor components, rotation sensor components (e.g., a gyroscope), and so forth. The environmental components 1160 include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium should be considered as being transportable from one physical location to another. Additionally, since the machine-readable medium 1138 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A method comprising:
receiving, at a server-computer, a message activity communication from a client device, the message activity communication including data about a message processed by the client device;
accessing, by one or more processors, a message indicator from a first data structure, the message indicator including a message activity score that is based, at least in part, on past messages sent from and received by the client device;
adjusting the message activity score based on the message activity communication;
accessing a parameter indicator from a second data structure, the parameter indicator including a first threshold activity score and an achievement pictograph;
matching the message indicator to the parameter indicator;
determining the message activity score transgresses the first threshold activity score;
responsive to determining the message activity score transgresses the threshold activity score, causing display of the achievement pictograph within a first user interface of the client device and a second user interface of a second client device;
determining the message activity score transgresses a second threshold activity score;
responsive to determining the message activity score transgresses the second threshold activity score, causing the display of the achievement pictograph to switch to a second achievement pictograph within the first user interface and the second user interface by removing the achievement pictogram and displaying the second achievement pictogram in place of the achievement pictogram, wherein the message activity score comprises the past messages exchanged between a first user of the client device and a second user of the second client device.

2. The method of claim 1, wherein causing the display of the achievement pictograph comprises causing the display of the achievement pictograph adjacent to a display of a user contact name.

3. The method of claim 2, wherein causing the display of the achievement pictograph to switch to the second achievement pictograph comprises removing the achievement pictograph adjacent to the user contact name and adding the second achievement pictograph adjacent to the user contact name.

4. The method of claim 2, wherein the achievement pictograph is representative of the second user of the second client device being in a first top ten friends of the first user of the client device, wherein the first top ten friends of the first user are determined based on messaging activity between users, and wherein the second user comprises the user contact name.

5. The method of claim 2, wherein the second achievement pictograph is representative of the first user of the client device being in a first top ten friends of the second user of a second client device but the second user not being in a second top ten friends of the first user, wherein the first top ten friends and the second top ten friends are determined based on messaging activity between users, and wherein the second user comprises the user contact name.

6. The method of claim 3, wherein the achievement pictograph comprises a smiley face emoji and wherein the second achievement pictograph comprises a smiley face wearing glasses emoji.

7. The method of claim 1, wherein the achievement pictograph is representative of a closeness status between the first user of the client device and the second user of a second client device.

8. The method of claim 7, wherein the closeness status is representative of how many of the past messages have been exchanged between the first user and the second user.

9. The method of claim 1, comprising determining that the first user of the client device and the second user of the second client device are on a messaging streak based on ephemeral messaging activity between the first user and the second user, and displaying a third achievement pictograph based on the ephemeral messaging activity.

10. The method of claim 9, wherein the third achievement pictograph comprises a flame emoji, a text based on a count of the messaging streak, or a combination thereof.

11. A system comprising:
one or more processors of a machine; and
a memory storing instructions that, when executed by the one or more processors, causes the machine to perform operations comprising:
receiving, at a server-computer, a message activity communication from a client device, the message activity communication including data about a message processed by the client device;
accessing, by one or more processors, a message indicator from a first data structure, the message indicator including a message activity score that is based, at least in part, on past messages sent from and received by the client device;
adjusting the message activity score based on the message activity communication;
accessing a parameter indicator from a second data structure, the parameter indicator including a first threshold activity score and an achievement pictograph;
matching the message indicator to the parameter indicator;
determining the message activity score transgresses the first threshold activity score;
responsive to determining the message activity score transgresses the threshold activity score, causing display of the achievement pictograph within a first user interface of the client device and a second user interface of a second client device;
determining the message activity score transgresses a second threshold activity score;
responsive to determining the message activity score transgresses the second threshold activity score, causing the display of the achievement pictograph to switch to a second achievement pictograph within the first user interface and the second user interface by removing the achievement pictogram and displaying the second achievement pictogram in place of the achievement pictogram, wherein the message activity score comprises the past messages exchanged between a first user of the client device and a second user of the second client device.

12. The system of claim 11, wherein causing the display of the achievement pictograph comprises causing the display of the achievement pictograph adjacent to a display of a user contact name.

13. The system of claim 12, wherein causing the display of the achievement pictograph to switch to the second achievement pictograph comprises removing the achievement pictograph adjacent to the user contact name and adding the second achievement pictograph adjacent to the user contact name.

14. The system of claim 12, wherein the achievement pictograph is representative of the second user of the second client device being in a first top ten friends of the first user of the client device, wherein the first top ten friends of the first user are determined based on messaging activity between users, and wherein the second user comprises the user contact name.

15. The system of claim 11, comprising determining that the first user of the client device and the second user of the second client device are on a messaging streak based on ephemeral messaging activity between the first user and the second user, and displaying a third achievement pictograph based on the ephemeral messaging activity.

16. A non-transitory machine-readable storage medium comprising instructions that, when executed by one or more processors of a machine, cause the machine to perform operations comprising:
- receiving, at a server-computer, a message activity communication from a client device, the message activity communication including data about a message processed by the client device;
- accessing, by one or more processors, a message indicator from a first data structure, the message indicator including a message activity score that is based, at least in part, on past messages sent from and received by the client device;
- adjusting the message activity score based on the message activity communication;
- accessing a parameter indicator from a second data structure, the parameter indicator including a first threshold activity score and an achievement pictograph;
- matching the message indicator to the parameter indicator;
- determining the message activity score transgresses the first threshold activity score;
- responsive to determining the message activity score transgresses the threshold activity score, causing display of the achievement pictograph within a first user interface of the client device and a second user interface of a second client device;
- determining the message activity score transgresses a second threshold activity score;
- responsive to determining the message activity score transgresses the second threshold activity score, causing the display of the achievement pictograph to switch to a second achievement pictograph within the first user interface and the second user interface by removing the achievement pictogram and displaying the second achievement pictogram in place of the achievement pictogram, wherein the message activity score comprises the past messages exchanged between a first user of the client device and a second user of the second client device.

17. The non-transitory machine-readable storage medium of claim 16, wherein the operations causing the display of the achievement pictograph comprise operations causing the display of the achievement pictograph adjacent to a display of a user contact name.

18. The non-transitory machine-readable storage medium of claim 17, wherein the operations causing the display of the achievement pictograph to switch to a second achievement pictograph comprise operations for removing the achievement pictograph adjacent to the user contact name and adding the second achievement pictograph adjacent to the user contact name.

19. The non-transitory machine-readable storage medium of claim 17, wherein the achievement pictograph is representative of the second user of the second client device being in a first top ten friends of the first user of the client device, wherein the first top ten friends of the first user are determined based on messaging activity between users, and wherein the second user comprises the user contact name.

20. The non-transitory machine-readable storage medium of claim 16, comprising operations for determining that the first user of the client device and the second user of a second client device are on a messaging streak based on ephemeral messaging activity between the first user and the second user, and displaying a third achievement pictograph based on the ephemeral messaging activity.

* * * * *